(12) United States Patent
Singla et al.

(10) Patent No.: US 11,188,642 B2
(45) Date of Patent: Nov. 30, 2021

(54) DISPLAYING REAL-TIME SECURITY EVENTS

(71) Applicant: HEWLETT-PACKARD DEVELOPMENT COMPANY, L.P., Houston, TX (US)

(72) Inventors: Anurag Singla, Sunnyvale, CA (US); Adam Brody, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 414 days.

(21) Appl. No.: 14/763,190

(22) PCT Filed: Jan. 28, 2013

(86) PCT No.: PCT/US2013/023474
§ 371 (c)(1),
(2) Date: Jul. 24, 2015

(87) PCT Pub. No.: WO2014/116264
PCT Pub. Date: Jul. 31, 2014

(65) Prior Publication Data
US 2015/0324581 A1    Nov. 12, 2015

(51) Int. Cl.
*G08B 21/00*     (2006.01)
*G06F 21/55*     (2013.01)
(Continued)

(52) U.S. Cl.
CPC ............ *G06F 21/552* (2013.01); *G06F 11/32* (2013.01); *H04L 41/22* (2013.01); *H04L 67/42* (2013.01);
(Continued)

(58) Field of Classification Search
CPC ........ G06F 3/0485; G06F 3/048; G06F 41/22; G06F 2201/86; G06F 21/552;
(Continued)

(56) References Cited

U.S. PATENT DOCUMENTS 5,633,657 A * 5/1997 Falcon .................... G06F 3/038
345/157
5,936,618 A * 8/1999 Spiero .................... G06F 3/147
345/204

(Continued)

FOREIGN PATENT DOCUMENTS

| JP | 2003111165 A | 4/2003 |
| KR | 20060074202 A | 7/2006 |
| KR | 20110101436 A | 9/2011 |

OTHER PUBLICATIONS

Heimerdinger, Scyllarus Intrustion Detection Report Correlator and Analyzer, Apr. 24, 2003, IEEE, pp. 1-3. (Year: 2003).*

(Continued)

*Primary Examiner* — Luu T Pham
*Assistant Examiner* — Jenise E Jackson

(57) ABSTRACT

A system and method for displaying a number of real-time security events comprises a number of client devices and an administrator device communicatively coupled to the client devices. The administrator device may comprise a preferences module and an event rate adapter module communicatively coupled to the preferences module. The preferences module receives input describing how to display a number of security events on the screen of a graphical user interface the event rate adapter module displays a number of real-time scrolling security events for a relatively longer period of time than other security events.

10 Claims, 5 Drawing Sheets

| Receipt Time | Event | Attacker IP Add. | Target IP Add. | Priority |
|---|---|---|---|---|
| 01/01/2001 00:00:01 | Unauthorized Launch of a Monitored File | 192.168.1.2 | 127.0.0.1 | 8 |
| 01/01/2001 00:00:01 | Unauthorized Launch of a Monitored File | 10.9.8.140 | | 8 |
| 01/01/2001 00:00:01 | Unauthorized Launch of a Monitored File | 10.9.8.140 | | 8 |
| 01/01/2001 00:00:01 | Unauthorized Launch of a Monitored File | 101.23.166.3 | 127.0.0.15 | 9 |
| 01/01/2001 00:00:01 | Unauthorized Launch of a Monitored File | 101.23.166.3 | 127.0.10.23 | 9 |
| 01/01/2001 00:00:05 | Unauthorized Launch of a Monitored File | 192.168.195.1 | 127.0.0.2 | 1 |
| 01/01/2001 00:00:05 | Unauthorized Launch of a Monitored File | 192.168.195.1 | 127.0.0.2 | 3 |
| 01/01/2001 00:00:05 | Unauthorized Launch of a Monitored File | 192.168.195.1 | 127.0.0.2 | 3 |
| 01/01/2001 00:00:06 | Unauthorized Launch of a Monitored File | 10.9.8.140 | 81.203.210.140 | 2 |
| 01/01/2001 00:00:07 | Unauthorized Launch of a Monitored File | 10.9.8.140 | 112.136.162.37 | 2 |
| 01/01/2001 00:00:07 | Unauthorized Launch of a Monitored File | 10.9.8.140 | 127.0.0.1 | 2 |
| 01/01/2001 00:00:07 | Unauthorized Launch of a Monitored File | 10.9.8.140 | 127.0.0.1 | 2 |
| 01/01/2001 00:00:07 | Unauthorized Launch of a Monitored File | 10.9.8.140 | 127.0.0.1 | 2 |
| 01/01/2001 00:00:08 | Unauthorized Launch of a Monitored File | 101.23.166.3 | 127.0.0.2 | 2 |

(51) Int. Cl.
    *H04L 29/06* (2006.01)
    *H04L 12/24* (2006.01)
    *G06F 11/32* (2006.01)

(52) U.S. Cl.
    CPC .... *G06F 2201/86* (2013.01); *G06F 2221/034* (2013.01)

(58) Field of Classification Search
    CPC .... G06F 11/32; G06F 2221/034; H04L 41/22; H04L 67/42
    USPC ......................................................... 726/22
    See application file for complete search history.

(56) References Cited

U.S. PATENT DOCUMENTS

| | | | | |
|---|---|---|---|---|
| 5,978,363 | A * | 11/1999 | Dimitrijevic | ...... H04B 7/18539 370/319 |
| 6,421,694 | B1 * | 7/2002 | Nawaz | ...................... G06F 3/14 715/234 |
| 6,477,572 | B1 * | 11/2002 | Elderton | ............. H04L 41/0893 709/224 |
| 7,921,459 | B2 | 4/2011 | Houston et al. | |
| 8,121,973 | B2 | 2/2012 | Anderson et al. | |
| 2004/0117802 | A1 | 6/2004 | Green | |
| 2004/0203959 | A1 * | 10/2004 | Coombes | ............... G06F 3/0485 455/466 |
| 2005/0108348 | A1 * | 5/2005 | Lee | ..................... H04M 7/0033 709/207 |
| 2008/0034322 | A1 * | 2/2008 | Kujirai | ................ G06F 3/04845 715/808 |
| 2009/0210823 | A1 * | 8/2009 | Bocking | ............... G06F 3/0482 715/821 |
| 2010/0049664 | A1 | 2/2010 | Kuo | |
| 2010/0083382 | A1 | 4/2010 | Farley et al. | |
| 2010/0122214 | A1 * | 5/2010 | Sengoku | ............... G06F 3/0485 715/830 |
| 2010/0172327 | A1 * | 7/2010 | Yun | ........................ H04H 20/59 370/331 |
| 2010/0180001 | A1 * | 7/2010 | Hardt | ....................... G06F 11/32 709/207 |
| 2011/0099500 | A1 * | 4/2011 | Smith | ................... G06F 3/0482 715/771 |
| 2011/0178962 | A1 * | 7/2011 | Sood | ....................... H04L 51/12 706/11 |
| 2012/0110599 | A1 | 5/2012 | Schoning | |
| 2012/0265878 | A1 * | 10/2012 | Appleton | ............ H04L 63/0272 709/224 |
| 2012/0290397 | A1 * | 11/2012 | Cortegiano | ........ G06Q 30/0207 705/14.64 |
| 2013/0007030 | A1 * | 1/2013 | Klawitter | .......... G06F 17/30905 707/758 |
| 2013/0014063 | A1 * | 1/2013 | Bocking | ............... G06F 3/0482 715/846 |
| 2013/0080348 | A1 * | 3/2013 | Pantaliano | ............. G06Q 30/02 705/347 |
| 2013/0117353 | A1 * | 5/2013 | Wong | ................ G06F 17/30867 709/203 |
| 2013/0182700 | A1 * | 7/2013 | Figura | ..................... H04L 43/08 370/352 |
| 2014/0305352 | A1 * | 10/2014 | Dowling | ............ G07C 9/00031 109/38 |
| 2014/0359007 | A1 * | 12/2014 | Grube | .............. G06Q 10/06315 709/203 |
| 2015/0213358 | A1 * | 7/2015 | Shelton | ............... H04L 41/0604 706/47 |

OTHER PUBLICATIONS

Conti et al, Countering Security Information Overload Through Alert and Packet Visualization, Mar. 20, 2006, IEEE, pp. 60-70. (Year: 2006).*

IBM, IBM Tivoli Security Information and Event Manager V1.0 Helps Optimize Security and Compliance by Combining Network Security with User Audit Analysis and Reporting, Announcement Letter No. ZP08-0139 dated Jan. 22, 2008, Retrieved from the Internet: <http://www-01.ibm.com/common/ssi/cgi-bin/ssialias?infotype=an&subtype=ca&appname=gpateam&supplier=877&letternum=ENUSZP08-0139 > [retrieved on Jul. 22, 2015], 31 pages.

International Search Report and Written Opinion, dated Oct. 25, 2013, PCT Patent Application No. PCT/US2013/023474, 11 pages.

Krstajic, M., et al., Cloudlines: Compact Display of Event Episodes in Multiple Time-series, Dec. 21, 2011, IEEE Transactions on Visualization and Computer Graphics, vol. 17, No. 12, pp. 2432-2439.

* cited by examiner

| File | Edit | View | Preferences | Help | | | |
|---|---|---|---|---|---|---|---|
| Receipt Time | | | Event | | Attacker IP Add. | Target IP Add. | Priority |
| 01/01/2001 00:00:01 | | | Unauthorized Launch of a Monitored File | | 192.168.1.2 | 127.0.0.1 | 8 |
| 01/01/2001 00:00:01 | | | Unauthorized Launch of a Monitored File | | 192.168.195.1 | 127.0.0.2 | 3 |
| 01/01/2001 00:00:01 | | | Unauthorized Launch of a Monitored File | | 192.168.195.1 | 127.0.0.2 | 3 |
| 01/01/2001 00:00:01 | | | Unauthorized Launch of a Monitored File | | 192.168.195.1 | 127.0.0.2 | 8 |
| 01/01/2001 00:00:01 | | | Unauthorized Launch of a Monitored File | | 10.9.8.140 | 81.203.210.140 | 2 |
| 01/01/2001 00:00:01 | | | Unauthorized Launch of a Monitored File | | 10.9.8.140 | 112.136.162.37 | 2 |
| 01/01/2001 00:00:01 | | | Unauthorized Launch of a Monitored File | | 10.9.8.140 | 127.0.0.1 | 2 |
| 01/01/2001 00:00:01 | | | Unauthorized Launch of a Monitored File | | 10.9.8.140 | 127.0.0.1 | 2 |
| 01/01/2001 00:00:01 | | | Unauthorized Launch of a Monitored File | | 10.9.8.140 | 127.0.0.1 | 8 |
| 01/01/2001 00:00:01 | | | Unauthorized Launch of a Monitored File | | 101.23.166.3 | 127.0.0.15 | 9 |
| 01/01/2001 00:00:01 | | | Unauthorized Launch of a Monitored File | | 101.23.166.3 | 127.0.10.23 | 9 |
| 01/01/2001 00:00:02 | | | Unauthorized Launch of a Monitored File | | 101.23.166.3 | 127.0.0.2 | 2 |

Fig. 2

DISPLAYING REAL-TIME SECURITY EVENTS

BACKGROUND

Security Information and Event Management (SIEM) technology provides real-time analysis of security alerts generated by network hardware and applications. SIEM technology can detect possible threats to a computing network. These possible threats can be determined from an analysis of security events.

BRIEF DESCRIPTION OF THE DRAWINGS

The accompanying drawings illustrate various examples of the principles described herein and are a part of the specification. The examples do not limit the scope of the claims.

FIG. 2 is a screenshot shown on the graphical user interface of the administrator device in FIG. 1 according to one example of the principles described herein.

Throughout the drawings, identical reference numbers designate similar, but not necessarily identical, elements.

DETAILED DESCRIPTION

Figure 1:
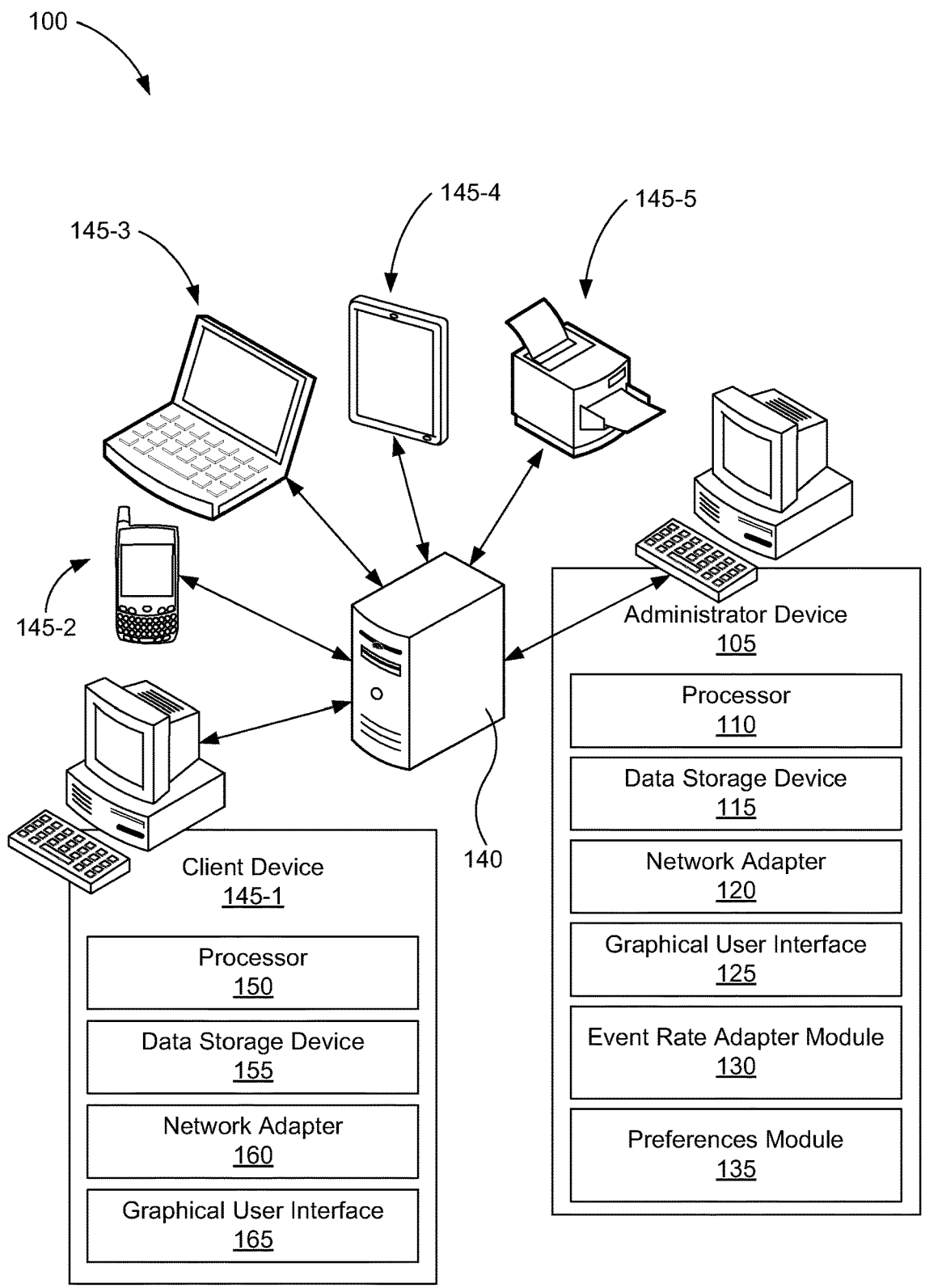
FIG. 1 is a block diagram of a system for adapting a display of real-time security events according to an example of the principles described herein

Network security administrators may monitor a number of security events within a computer network on a graphical user interface. The interface may be used to see a number of scrolling, real-time security events. The number of security events may increase as the number of individual computing devices communicatively coupled to the network increases.

As described above, security events occurring on a network may be monitored by a network security operator. This may be done by presenting a scrolling number of security events on a graphical user interface (GUI). That GUI may present the network security administrator with a chronological listing of security events and may be done in real-time. However, as the number of computing devices communicatively coupled to the network increases, the number of potential security events also increases. This may place the network security administrator in a situation where all scrolling events are not given an appropriate amount of scrutiny or even seen at all. Additionally, the rate of flow of security events scrolling on the GUI may not be constant throughout the day and the time at which a level of extra attention to security events may be missed by a network security administrator.

As a result, either the security events associated with the computer network can scroll across the GUI at an unreliable and unreadable rate, or those security events can be refreshed periodically resulting in the security events not being displayed in real-time.

The present specification therefore describes a system for adapting a display of real-time security events, comprising a number of client devices and an administrator device communicatively coupled to the client devices, the administrator device comprising a preferences module and an event rate adapter module communicatively coupled to the preferences module, in which the preferences module receives input describing how to display a number of security events on the screen of a graphical user interface; and in which the event rate adapter module displays a number of real-time scrolling security events for a relatively longer period of time than other security events. The present specification further describes a method of displaying a number of real-time security events, comprising receiving preferences from a preference module of a computer network administrator device and scrolling security events associated with the client devices across a graphical user interface leaving relatively more critical security events on the screen for a relatively longer period of time.

Still further, the present specification describes a computer program product for displaying a number of real-time security events, the computer program product comprising a computer readable storage medium comprising computer usable program code embodied therewith, the computer usable program code comprising a computer usable program code to, when executed by a processor, receive preferences from a preference module of a computer network administrator device, and computer usable program code to, when executed by a processor, scroll security events associated with a number of client devices on the computer network across a graphical user interface leaving relatively more critical security events on the screen for a relatively longer period of time.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

FIG. 1 is a block diagram of a system (100) for adapting a display of real-time security events according to an example of the principles described herein. The system (100) may comprise an administrator device (105), a server (140), and a number of client devices (145-1, 145-2, 145-3, 145-3, 145-4, 145-5). Each of these will now be described below. The administrator device (105) may comprise a processor (110), a data storage device (115), a network adapter (120), a graphical user interface (125), an event rate adapter module (130) and a preferences module (135).

The data storage device (115) may store data such as executable program code that is executed by the processor (110) or other processing device. As will be discussed, the data storage device (115) may specifically store a number of applications that the processor (110) executes to implement at least the functionality of providing a network administrator, via the graphical user interface (125) with an adaptive view of any security events occurring on a computing network.

The data storage device (115) may include various types of memory modules, including volatile and nonvolatile memory. For example, the data storage device (115) of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device (115) as may suit a particular application of the principles described herein. In certain examples, different types of memory in the data storage device (115) may be used for different data storage needs. For example, in certain examples the processor (105) may boot from Read Only Memory (ROM), maintain nonvolatile storage in the Hard Disk Drive (HDD) memory, and execute program code stored in Random Access Memory (RAM).

Generally, the data storage device (115) may comprise a computer readable storage medium. For example, the data storage device (115) may be, but not limited to, an electronic, magnetic, optical, electromagnetic, infrared, or semiconductor system, apparatus, or device, or any suitable combination of the foregoing types of systems, apparatus or devices. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The processor (110) may receive instructions from computer readable program code stored on the data storage device (115). The computer readable program code may be used by the processor to at least establish a network connection with any number of client devices (145-1, 145-2, 145-3, 145-3, 145-4, 145-5) and the server (140), accept and send input to the client devices (145-1, 145-2, 145-3, 145-3, 145-4, 145-5) and the server (140), and otherwise accept instructions from administrator using the administrator device (105) to affect those actions engaged in while the administrator is monitoring security events on a network.

The network adapter (120) may also be included with the administrator device (105). The network adapter (120) may provide communication between the individual client devices (145-1, 145-2, 145-3, 145-3, 145-4, 145-5) and the server (140). As will be described below, the network adapter (120) may provide the administrator of the administrator device (105) with the ability to upload and download content provided on a network. This data may specifically include data associated with security events occurring on each of the client devices (145-1, 145-2, 145-3, 145-3, 145-4, 145-5). Additionally, the network adapter (125) may provide the administrator of the administrator device (105) with the ability to alter processes and computer readable program code on each of the client devices (145-1, 145-2, 145-3, 145-3, 145-4, 145-5). The network adapter (120) may facilitate a wired or wireless communication.

The administrator device (105) may further comprise a graphical user interface (125). Through the graphical user interface (120) the administrator may monitor the security events associated with each of the client devices (145-1, 145-2, 145-3, 145-3, 145-4, 145-5). The security events displayed may also include correlation events that are generated as part of analysis of one or more security events. As will be discussed below, the security events may be scrolled across the screen of the graphical user interface and may provide the administrator with the appropriate information regarding each security event detected. The graphical user interface, via the execution of the event rate adapter module (130), may display the security events for a reasonable amount of time before the events scroll off the screen. In one example, security events associated with the number of client devices (145-1, 145-2, 145-3, 145-3, 145-4, 145-5) will scroll off the screen of the graphical user interface (125) at a rate that a human eye can discern when the computer network is experiencing a high security event rate. In another example, security events associated with the number of client devices (145-1, 145-2, 145-3, 145-3, 145-4, 145-5) will scroll off the screen of the graphical user interface (125) at a rate that is pre-defined by the administrator. In yet another example, certain security events associated with the number of client devices (145-1, 145-2, 145-3, 145-3, 145-4, 145-5) appear on the screen of the graphical user interface (125) for a period of time longer than other certain events. The length of time that any specific security event continues to be viewable on the screen of the graphical user interface (125) may be determined by the type or criticality of the security event. These durations may be predefined by the administrator as well.

In still another example, certain security events associated with the number of client devices (145-1, 145-2, 145-3, 145-3, 145-4, 145-5) appear on the screen of the graphical user interface (125) until specifically addressed or acknowledged by a user of the administrator device (105). In this example, the user of the administrator device may set preferences by which a certain type or types of security events will remain on the graphical user interface (125) until the user has acknowledged the security events by, for example, clicking on them with a mouse or taking steps to address the security event. In one example, the types of security events that remain on the screen until a user of the administrator device (105) acknowledges them is based on a priority number assigned to the security event in which the priority number defines the seriousness of the security event.

As briefly mentioned above, the administrator device (105) may further comprise an event rate adapter module (130). The event rate adapter module (130), along with the preferences module (135), provides the administrator with the ability to set preferences as to which security events are shown on the graphical user interface (125) and apply those preferences to adapt the rate at which any specific security event is scrolled off of the screen of the graphical user interface (125) or to determine which security events are to remain on the graphical user interface (125) until the user of the administrator device (105) acknowledges those events.

During operation, the preferences module (135) receives preferences from an administrator on how to treat each security event notification. As described above, the administrator may be allowed to set which security events will be displayed on the screen of the graphical user interface (125) for an additional length of time before they are scrolled off of the screen. In some cases, the security events may be rated using, for example, a rating system ranging form 1 to 10 where 10 is the most critical security event. Therefore, in one example, a security event that has been rated as being a 10, then, according to the preferences set by the administrator and received by the preferences module (135), will cause the event rate adapter module (130) to present that security event on the screen longer than other less critically rated events.

In another example, the administrator may set a general rate at which all security events scroll off of the screen of the graphical user interface (125). In this example, the scroll rate may be set at least at a rate that is discernable to the human eye while viewing the scrolling security events. The administrator may then also slow down the scrolling rate if, for example, the administrators reading abilities are slower than a current scrolling rate. Still further, when the computer network is experiences a relatively higher volume of security events, the administrator may adjust the scrolling rate of each security event based on the events' criticality. In this example, the administrator may set a criticality range by which each security event that falls into that criticality range will be scrolled off of the screen of the graphical user interface (125) at, for example, either a slow rate, a fast rate, or an average rate. Each of these rates will be determined by the event rate adapter module (130) after receiving the appropriate administrator preferences from the preferences module (135).

Each of the client devices (145-1, 145-2, 145-3, 145-3, 145-4, 145-5) may comprise a processor (150), a data storage device (155), a network adapter (160), and a graphical user interface (165). FIG. 1 shows that the client devices (145-1, 145-2, 145-3, 145-3, 145-4, 145-5) may generally be any type of computing devices. Some examples of a client device (145-1, 145-2, 145-3, 145-3, 145-4, 145-5) may include a desktop computer (145-1), a smartphone (145-2), a laptop computer (145-3), a tablet (145-4), and a printer (145-5), among others. The client devices (145-1, 145-2, 145-3, 145-3, 145-4, 145-5) may connect to the server (140) and may each be able to convey to the server (140) security events that occurring at that client device (145-1, 145-2, 145-3, 145-3, 145-4, 145-5). Although FIG. 1, shows that each of the client devices (145-1, 145-2, 145-3, 145-3, 145-4, 145-5) are communicatively coupled to a server which is in turn communicatively coupled to the administrator device (105), the present specification contemplates that each client device (145-1, 145-2, 145-3, 145-3, 145-4, 145-5) is directly connected to the administrator device (105). The present specification further contemplates every network structure which allows the administrator device (105) to receive, either directly or indirectly, data describing those security events occurring on each of the client devices (145-1, 145-2, 145-3, 145-3, 145-4, 145-5). In one example, ArcSight Connectors® developed by Hewlett-Packard® may be used to connect to the client devices (145-1, 145-2, 145-3, 145-3, 145-4, 145-5), retrieve events that are occurring at that client device (145-1, 145-2, 145-3, 145-3, 145-4, 145-5), and send those events to the server (140).

Figure 3:
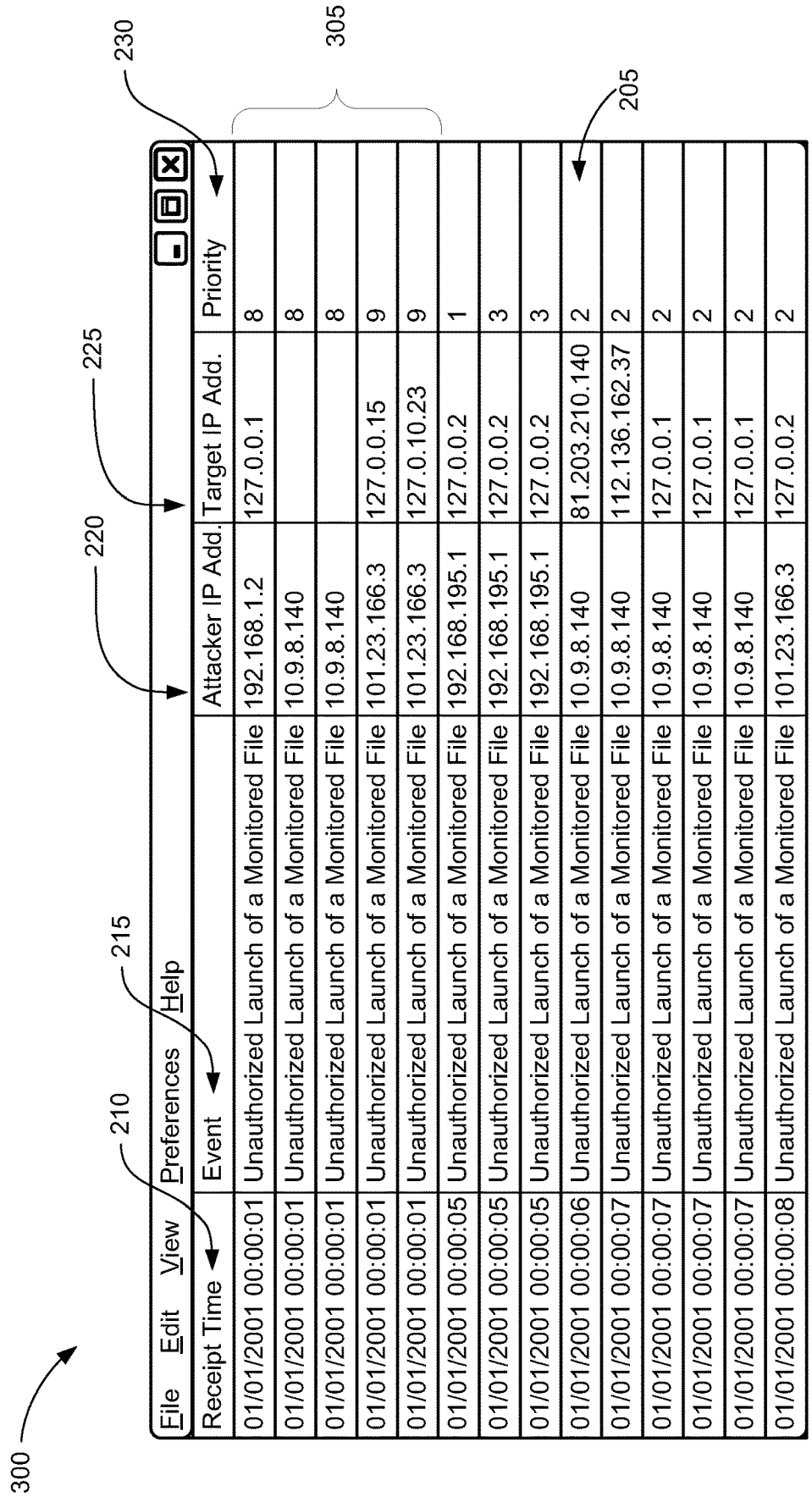
FIG. 3 is a screenshot shown on the graphical user interface of the administrator device in FIG. 1 according to another example of the principles described herein.

FIGS. 2 and 3 show a screenshot resulting from the operation of the event rate adapter module (130) according to one example of the principles described herein. FIG. 2 specifically shows a scrolling list of real-time security events (205) as displayed on the screen of the graphical user interface (FIG. 1, 125) of the administrator device (FIG. 1, 105). As described above, the administrator device (FIG. 1, 105) receives data describing a number of security events from each of the client devices (FIG. 1, 145-1, 145-2, 145-3, 145-3, 145-4, 145-5).

The data presented to the administrator viewing the graphical user interface (FIG. 1, 125) may include a number of event fields, for example, the receipt time (210) of the security event, the event type (215), the IP address of the attacker (220), the IP address of the target client device (225), and a priority number (230) set by the administrator device (FIG. 1, 105). Other data may be included to better define the type, time, and criticality of the security event that takes place on any specific client device (FIG. 1, 145-1, 145-2, 145-3, 145-3, 145-4, 145-5) and the present specification contemplates the use of this additional data.

The priority number (230) assigned to each security event (205) may be assigned by the administrator device (FIG. 1, 105) as a result of a correlation of the security event attributes with other security events' attributes. As described above, the criticality of each security event (205) may be assessed and given a number based on the criticality of that event (205). The criticality of the event may be used in the overall priority calculation for the security event. Information describing the criticality of the even may be provided to the administrator via the graphical user interface (FIG. 1, 125) as shown in FIG. 2. In addition, the event rate adapter module (FIG. 1, 130) may cause certain security events (205) to appear on the graphical user interface (FIG. 1, 125) for a longer or shorter period of time.

Certain events, based on their priority, or other filter criteria specified in preferences module (135) can also be made to appear on the graphical user interface (FIG. 1, 125) for a relatively longer period of time. A portion of the scrolling list of real-time security events (205) may be used for such events. If there are no critical events that should appear on the graphical user interface (FIG. 1, 125) for a relatively longer period of time, regular events may be displayed in that area. In one example, a user of the administrator device (FIG. 1, 105) may have to manually acknowledge the sticky events for them to disappear. In this example, a user may acknowledge a number of these critical events together. In an example where there are more of these critical events than can be displayed on the portion of the scrolling list of real-time security events (205), only the displayable number of critical events are show. The user interface (FIG. 1, 125) may further provide a count of any hidden critical events not yet addressed by the user of the administrator device (FIG. 1, 105). In this example, those critical events not yet displayed may be displayed when the currently displayed critical events are acknowledged by the user. This may ensure that the important events are not left unaddressed by the user during the scrolling of the security events or after the user has stepped away from the screen for few minutes.

Turning now to FIG. 3, the event rate adapter module (FIG. 1, 130) has scrolled through a number of additional security events as time has progressed. As can be seen, a number of first security events (305) have remained on the screen-shot (300). These events, per the preferences entered into the preferences module (FIG. 1, 135) by the administrator, have caused that the higher priority security events remain viewable to the administrator for a relatively longer period of time such that an administrator may be made aware of these higher priority and be given an appropriate amount of time to react to these security events. An amount of time may then pass such that these events are also scrolled off of the screen providing more visible space on the graphical user interface (FIG. 1, 125) for other security events occurring in real-time on the client devices (FIG. 1, 145-1, 145-2, 145-3, 145-3, 145-4, 145-5).

In the example shown in FIG. 3, the higher priority or relatively more critical security events have been placed at the top of the list of scrolling events. In this example, the list of critical security events are in themselves listed in chronological order compared to each of the other as well as in chronological order as compared to the new security events that have been scrolled onto the screen in FIG. 3.

In another example, the screen may be split into two separate fields, one field representing a scrolling list of relatively more critical security events with another field representing a newly scrolled list of real-time security events. A user may sort the events based on any event field (210, 215, 220, 225, 230) or multiple event fields (210, 215, 220, 225, 230). The retained events (205) will be displayed in the appropriate row based on the sorting order. In one example, if the sorting is based on descending receipt time (210), then the higher priority events will be displayed towards the bottom of the screen as newer events fill the top rows of the scrolling list of real-time security events (205).

Although the event field "priority" is used in one of the above example to calculate the scrolling time of events, any event field or a calculated value can be used to determine the scrolling rate of the events. A user may also utilize multiple filters matching specific events to determine which events are to appear on the graphical user interface (FIG. 1, 125) for a relatively longer period of time.

In another example, the relatively more critical security events (305) may remain on the screen, but may be made to look as if they are hovering over the remaining scrolling security events. This allows an administrator to view not only in real-time those events as they occur over the network, but also those security events that are relatively more critical to the network and each client device (FIG. 1, 145-1, 145-2, 145-3, 145-3, 145-4, 145-5) on the network.

In yet another example, the higher priority events (305) may further scroll off of the screen as time passes. In this example, the criticality of the security event as well as the administrator's preferences may dictate the scroll speed of these events. The preferences module may provide with any type of specificity or generality how long the relatively more critical security events stay on the screen of the graphical user interface (FIG. 1, 125).

Figure 4:
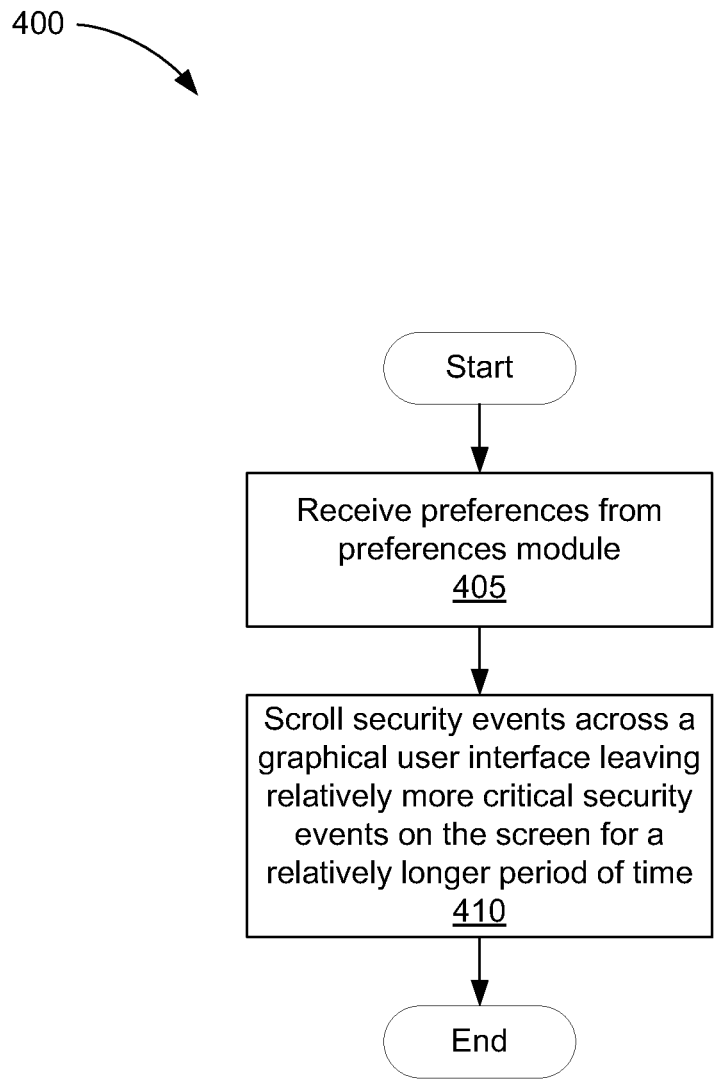
FIG. 4 is a flowchart showing a method of adaptively displaying real-time security events according to one example of the principles described herein.

FIG. 4 is a flowchart showing a method (400) of adaptively displaying real-time security events according to one example of the principles described herein. The method (400) may begin with the event rate adapter module (FIG. 1, 130) receiving (405) preferences from the preferences module (FIG. 1, 135). These preferences may include any of the preferences chosen by the administrator as described above. In one example, the preferences may define what type of security event is to be presented on the screen of the administrator device's (FIG. 1, 105) graphical user interface (FIG. 1, 125) and for what length of time. As described above, the level of criticality assigned by the administrator may be used to determine if and how long any particular security events remains on the screen relatively longer than other security events. Therefore, the administrator may set the level of criticality of any specific type of security event with the knowledge that this will result in that type of security event being displayed for a longer or shorter period of time relative to other types of security events.

The method (400) may then continue with the event rate adapter module (FIG. 1, 130) scrolling (410) the security events across the graphical user interface (FIG. 1, 125) while leaving relatively more critical security events on the screen for a relatively longer period of time.

Figure 5:
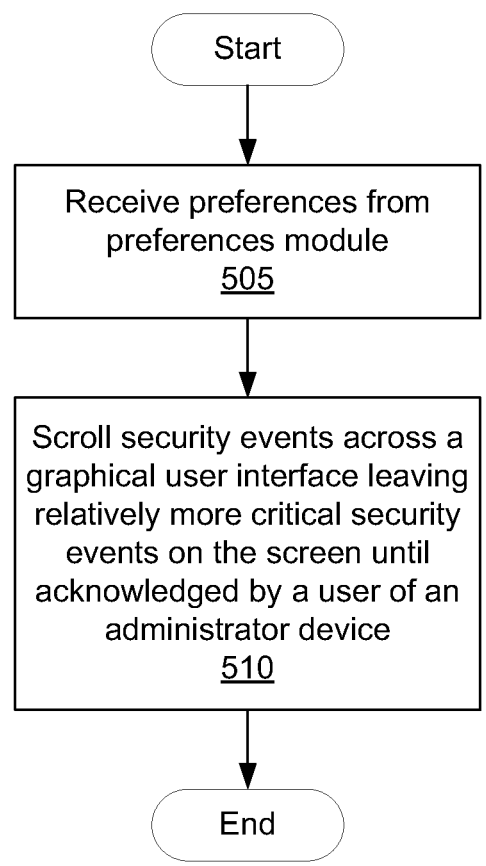
FIG. 5 is a flowchart showing a method of adaptively displaying real-time security events according to another example of the principles described herein.

FIG. 5 is a flowchart showing a method (500) of adaptively displaying real-time security events according to another example of the principles described herein. The method (500) may begin with the event rate adapter module (FIG. 1, 130) receiving (505) preferences from the preferences module (FIG. 1, 135). These preferences may include any of the preferences chosen by the administrator as described above. In one example, the preferences may define what type of security event is to be presented on the screen of the administrator device's (FIG. 1, 105) graphical user interface (FIG. 1, 125). As described above, the level of criticality assigned by the administrator may be used to determine if any particular security event remains on the screen before a user of the administrator device acknowledges those events. Therefore, the administrator may set the level of criticality of any specific type of security event with the knowledge that this will result in that type of security event being displayed on the graphical user interface (FIG. 1, 125) until the user acknowledges the security event.

The method (500) may then continue with the event rate adapter module (FIG. 1, 130) scrolling (510) the security events across the graphical user interface (FIG. 1, 125) while leaving relatively more critical security events on the screen until a user of the administrator device acknowledges those security events.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (FIG. 1, 110) of the administrator device (FIG. 1, 105) or other programmable data processing apparatus, implement the functions or acts specified in the flowchart and/or block diagram block or blocks. In one example, the computer usable program code may be embodied within a computer readable storage medium; the computer readable storage medium being part of the computer program product.

In one example, the methods described above may be accomplished by a computer program product comprising a computer readable storage medium having computer usable program code embodied therewith that, when executed by the processor (110) of the administrator device (FIG. 1, 105) or another processing device, performs the above methods. Specifically, the computer usable program code, when executed by a processor (110), causes the processor (110) to receive (FIG. 4, 405) preferences from the preferences module (FIG. 1, 135). Further, in one example, the computer usable program code, when executed by a processor (110), may cause the processor (110) to scroll (FIG. 4, 410) a number of security events across the graphical user interface (FIG. 1, 125) while leaving relatively more critical security events on the screen for a relatively longer period of time. In another example, the computer usable program code, when executed by a processor (110), may cause the processor (110) to scroll (FIG. 4, 410) a number of security events across the graphical user interface (FIG. 1, 125) while leaving relatively more critical security events on the screen until those security events are acknowledged by a user of the administrator device (FIG. 1, 105).

The specification and figures describe a system and method of adapting a display of real-time security events. The described system and method provides for a number of security events to be displayed at an adjustable rate such that the events may be discernable by the human eye. This provides for a security administrator to review each security event as it occurs within the network. Additionally, as the events per second increases, the events may be scrolled across the screen of the graphical user interface at a rate defined by an administrator via a preferences module on the administrator device. Still further, a number of relatively more critical security events may be made to appear on the screen of the graphical user interface for a relatively longer period of time than other relatively less critical security events. Even further, a number of relatively more critical security events may be left on the screen of the graphical user interface until a user of the administrator device acknowledges those events. This identifies, to a network administrator, relatively more critical security events while still providing a view of the latest events so that the administrator may receive the best information at one time.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system comprising:
a processor; and
a non-transitory computer-readable data storage medium storing instructions that, when executed by the processor, cause the processor to:
receive data describing a first rating associated with a first subset of a plurality of security events of a computer network and a second rating associated with a second subset of the plurality of security events, wherein the first and second ratings correspond to the first subset of the plurality of security events being more critical than the second subset of the plurality of security events;
display security events of the plurality of security events in a window;
scroll the security events displayed in the window; and
control the scrolling of the security events displayed in the window such that at least a portion of the security events of the first subset of the plurality of security events remain displayed in the window until an input acknowledges the respective security events, and unacknowledged security events of the second subset of the plurality of security events are scrolled off the window.

2. The system of claim 1, wherein the processor executes the instructions to further remove a displayed security event responsive to user selection of the displayed security event.

3. The system of claim 1, wherein a first security event having a higher criticality than a second security event has a greater length of time in which the first security event is displayed in the window than the second security event.

4. The system of claim 1, wherein each security event of the plurality of security events includes a horizontal line of information,
wherein the horizontal lines of information are scrolled in a direction from a first end of the window to a second end of the window.

5. A method comprising:
receiving data describing a first rating associated with a first subset of a plurality of security events of a computer network and a second rating associated with a second subset of the plurality of security events, wherein the first and second ratings correspond to the first subset of the plurality of security events being more critical than the second subset of the plurality of security events;
displaying security events of the plurality of security events in a window;
scrolling the security events displayed in the window; and
controlling the scrolling of the security events displayed in the window such that at least a portion of the security events of the first subset of the plurality of security events remain displayed in the window until an input acknowledges the respective security events, and unacknowledged security events of the second subset of the plurality of security events are scrolled off the window.

6. The method of claim 5, further comprising removing a displayed security event responsive to user selection of the displayed security event.

7. The method of claim 5, further comprising receiving user preference as to definition of the criticalities for the security events.

8. The method of claim 5, wherein each security event of the plurality of security events includes a horizontal line of information,
wherein the horizontal lines of information are scrolled in a direction from a first end of the window to a second end of the window.

9. A non-transitory computer readable storage medium storing instructions executable by a processor to:
receive data describing a first rating associated with a first subset of a plurality of security events of a computer network and a second rating associated with a second subset of the plurality of security events, wherein the first and second ratings correspond to the first subset of the plurality of security events being more critical than the second subset of the plurality of security events;
display security events of the plurality of security events in a window;
scroll the security events displayed in the window; and
control the scrolling of the security events displayed in the window such that at least a portion of the security events of the first subset of the plurality of security events remain displayed in the window until an input acknowledges the respective security events, and unacknowledged security events of the second subset of the plurality of security events are scrolled off the window.

10. The non-transitory computer readable storage medium of claim 9, wherein each security event of the plurality of security events includes a horizontal line of information,
wherein the horizontal lines of information are scrolled in a direction from a first end of the window to a second end of the window.

* * * * *